US006993613B2

(12) United States Patent
Connor et al.

(10) Patent No.: US 6,993,613 B2
(45) Date of Patent: Jan. 31, 2006

(54) METHODS AND APPARATUS FOR REDUCING RECEIVE INTERRUPTS VIA PACED INGRESS INDICATION

(75) Inventors: Patrick L. Connor, Portland, OR (US); Patrick J. Luhmann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 09/955,370

(22) Filed: Sep. 17, 2001

(65) Prior Publication Data

US 2003/0056047 A1    Mar. 20, 2003

(51) Int. Cl.
    G06F 13/24    (2006.01)
(52) U.S. Cl. ............... 710/260; 710/105; 710/310; 370/902; 370/912; 709/230
(58) Field of Classification Search ............... 370/912, 370/902; 710/107, 260–266, 105, 310; 709/230
See application file for complete search history.

(56) References Cited

U.S. PATENT DOCUMENTS

| 6,381,713 | B1 * | 4/2002 | Irvin et al. ............... 714/701 |
| 6,633,575 | B1 * | 10/2003 | Koodli ............... 370/412 |
| 6,650,640 | B1 * | 11/2003 | Muller et al. ............... 370/392 |
| 6,665,724 | B2 * | 12/2003 | Lawrence ............... 709/230 |
| 2002/0021701 | A1 * | 2/2002 | Lavian et al. ............... 370/401 |
| 2003/0067940 | A1 * | 4/2003 | Edholm ............... 370/468 |
| 2003/0140153 | A1 * | 7/2003 | Lawrence ............... 709/230 |
| 2005/0157733 | A1 * | 7/2005 | Liu et al. ............... 370/401 |

OTHER PUBLICATIONS

Jorgen Svaerke Hansen, A Scheduling Scheme for Network Saturated NT Multiprocessors, Aug. 1997, pp. 1-7, The USENIX Windows NT Workshop Proceedings.
Jeffrey C. Mogul, Eliminating Receive Livelock in an Interrupt-Driven Kernel, Jan. 1996, pp. 1-15, Proceedings of the USENIX 1996 Annual Technical Conference, San Diego, California.

* cited by examiner

Primary Examiner—Rehana Perveen
Assistant Examiner—Kim T. Huynh
(74) Attorney, Agent, or Firm—Blakely, Sokoloff, Taylor & Zafman LLP

(57) ABSTRACT

Methods, apparatus, and articles of manufacture for efficiently handling incoming network traffic by preventing protocol stack overruns and minimizing packet latency are disclosed herein. Embodiments of the present invention monitor the level of a protocol stack's packet queue, and, in response to an increase in the level of the packet queue above an initial threshold value, disable the generation of receive interrupts from the communications interface, disable automatic packet indication of packets by the device driver to the protocol stack, and identify and indicate new incoming packets to the protocol stack at a rate equal to or less than the rate at which packets are being processed by the protocol stack. In addition, in response to a decrease in the level of the packet queue below an exit threshold value, the generation of receive interrupts and the automatic indication of packets to the protocol stack may be re-enabled.

34 Claims, 4 Drawing Sheets

METHODS AND APPARATUS FOR REDUCING RECEIVE INTERRUPTS VIA PACED INGRESS INDICATION

TECHNICAL FIELD OF THE INVENTION

This disclosure relates to device drivers, and more particularly, but not exclusively, to methods, apparatus, and articles of manufacture for reducing receive interrupts by indicating the arrival of incoming network traffic in response to an evaluation of a protocol stack's processing rate.

BACKGROUND INFORMATION

Physical devices interconnected in a computer system frequently utilize an interrupt as a mechanism for indicating the occurrence of certain events. An interrupt generally comprises a signal, transmitted from a device to a processor in the computer system, requesting attention from the processor. For example, a network adapter, coupled to the processor, may generate, via a network controller, a receive interrupt upon receiving an incoming packet from a network (a packet generally comprises a package of information transmitted as a unit in synchronous communications). The receive interrupt is intended to indicate to the processor that a new packet has arrived from the network, and to identify a location in a memory from which the packet may be retrieved.

At system initialization, a device driver—a software component that permits a computer system to communicate with a device and often manipulates data in order to transmit data to the device—allocates a plurality of receive packet buffers and identifies the location of the buffers in host memory to the network controller. As packets arrive from the network, the network controller transfers the incoming packets to the packet buffers allocated by the device driver at initialization, and generates the receive interrupt to indicate that new packets have arrived.

The network adapter, also commonly referred to as a network interface card, comprises an expansion card, or similar device, used to provide network access to a computer system, or other device (e.g., a printer), and to mediate between the computer system and the physical media, such as cabling or the like, over which network transmissions (e.g., packets) travel. Receipt of the receive interrupt by the processor triggers the execution of an interrupt handler (generally a function of the device driver) for processing the newly arrived packet, as well as other packets which may have arrived during a scheduling latency created as the processor completes its current tasks and switches contexts to execute the interrupt handler. The interrupt handler comprises a special routine executed when a specific interrupt occurs, and which includes instructions for dealing with the particular situation that caused the interrupt. The interrupt handler examines the network controller to determine the cause of the interrupt, for instance, the receipt of new packets from the network, and indicates the newly arrived packets to a protocol stack for processing. The protocol stack comprises a set of protocols (e.g., Transmission Control Protocol/Internet Protocol ("TCP/IP")) that work together on different levels to enable communication on a network. When the protocol stack finishes processing a packet, the packet buffer is returned to the device driver to be used for subsequent packets.

Each interrupt, and the execution of the interrupt handler, introduces an amount of "overhead" to the computer system's processor. The overhead comprises work or information that provides support for a computing process, but is not an intrinsic part of the operation or data. For example, with each incoming packet, the processor may need to send a signal comprising the packet, over a bus, or otherwise transfer the packet to one or more other components of the computer system. This overhead may significantly impact processing time, especially in the context of modern operating systems, such as Windows NT®, or Windows® 2000.

After the protocol stack has been given several packets to process, interrupts generated by the network controller indicating the arrival of new packets from the network interfere with the processing operations for the packets currently indicated to the protocol stack. These interrupts delay the processing of the previously indicated packets by causing the processor to stop executing work for the protocol stack, and to instead process the interrupts. In severe circumstances, often referred to as "interrupt storms," the receive interrupts can be so numerous as to prevent the protocol stack from making any forward progress in the processing operations of the currently indicated packets, many times resulting in dropped packets. This situation, in which forward progress has been effectively stopped, is referred to as "live-lock."

Methods exist for detecting when "live-lock" is likely to occur, and for disabling the generation of receive interrupts from network controllers in response to this condition. However, these methods then typically rely on a polling process to periodically determine the status of each device in order to indicate new packets to the protocol stack. Because polling rates are not easily constrained in, for example, a Windows® operating system, the rate of indication of new packets to the protocol stack may continue to outpace the protocol stack's packet-processing rate, thereby overrunning the protocol stack's queues, and causing packets to be dropped. On the other hand, in certain situations, waiting for a polling timer to complete a cycle may increase latency of packets unnecessarily. Latency refers to the period of time that passes between the arrival of a packet at the network adapter, and execution of the interrupt handler.

While a static indication policy may be optimized for a particular ideal workload, as runtime workload shifts away from the ideal workload, the static policy may degrade overall system performance, thereby resulting in dropped packets (e.g., if packets are indicated too often), or poor response latency (e.g., if packets are not indicated often enough).

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Figure 1:
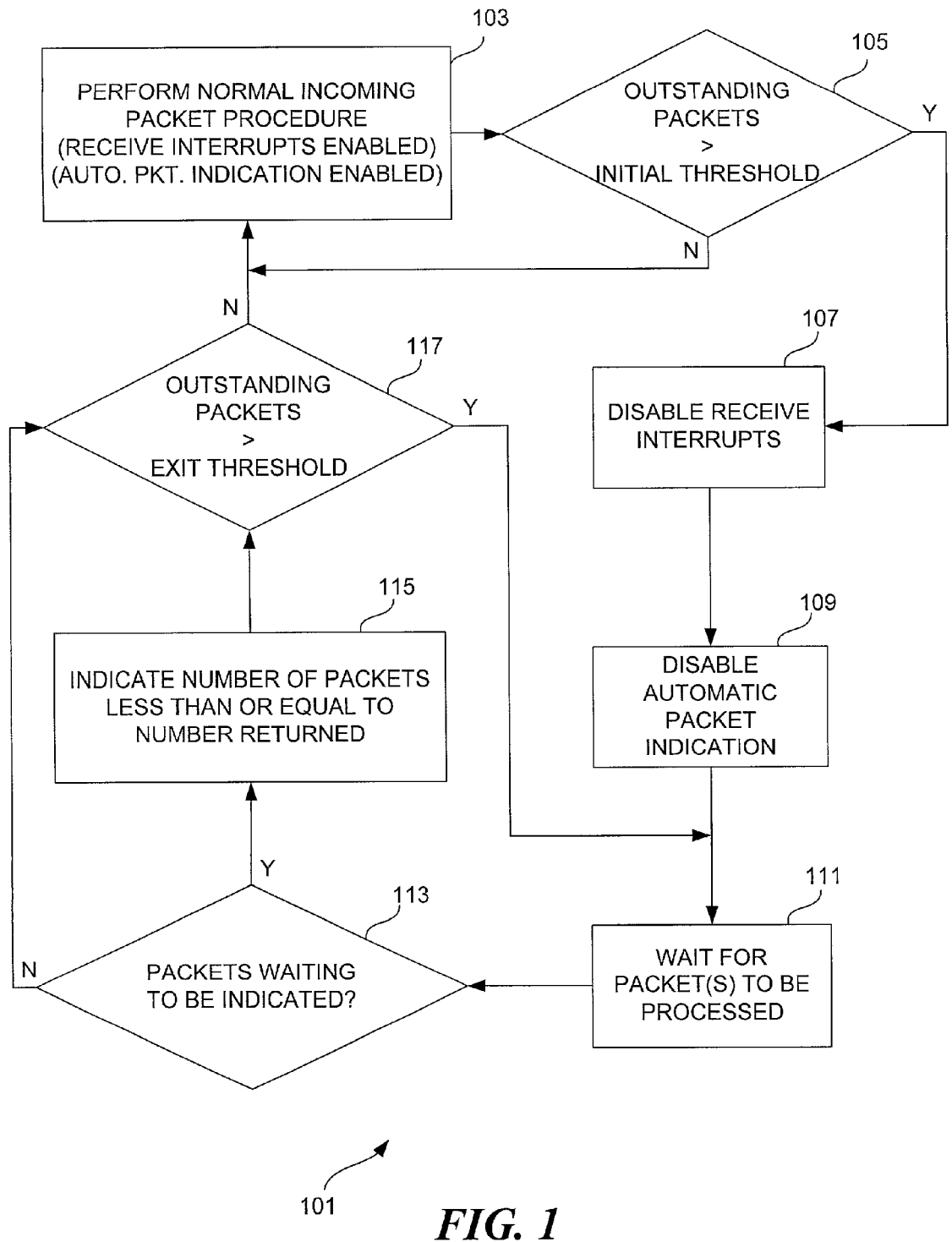
FIG. 1 is a flow diagram illustrating one embodiment of a flow of events in a process to reduce receive interrupts via paced ingress indication in accordance with the teachings of the present invention.

Embodiments of methods, apparatus, and articles of manufacture for reducing receive interrupts via paced ingress indication are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide methods, apparatus, and articles of manufacture for efficiently handling incoming network traffic by preventing protocol stack overruns and minimizing packet latency. As incoming network traffic levels increase, packets indicated to a protocol stack become backlogged in a packet queue while awaiting processing by the protocol stack. Concurrently, incoming packets cause receive interrupts to be generated by a network adapter's controller, reducing processor availability to process backlogged packets, many times resulting in overruns of the protocol stack's packet queues and leading to dropped packets.

Embodiments of the present invention monitor the packet queue of the protocol stack, and, in response to an increase in a level of the packet queue above a predefined initial threshold value, disable normal packet identification procedures (e.g., disable generation of receive interrupts and disable automatic packet indication). In one embodiment, the level of the packet queue may correspond to a number of outstanding packets that have been indicated to the protocol stack, but not yet processed. In another embodiment, the level of the packet queue may correspond to a number or receive packet buffers containing outstanding packets. Having disabled normal packet identification procedures, new packets may then be indicated to the protocol stack, in one embodiment, at an indication rate equal to or less than a rate at which packets are being processed by the protocol stack (e.g., a packet processing rate), thereby preventing overruns of the packet queues and minimizing packet latency. Furthermore, in response to a decrease in the level of the packet queue below a predefined exit threshold value, embodiments of the present invention re-enable normal packet identification procedures, including the generation of receive interrupts and automatic packet indication. Other features of the illustrated embodiments will be apparent to the reader from the foregoing and the appended claims, and as the detailed description and discussion is read in conjunction with the accompanying drawings.

Figure 2:
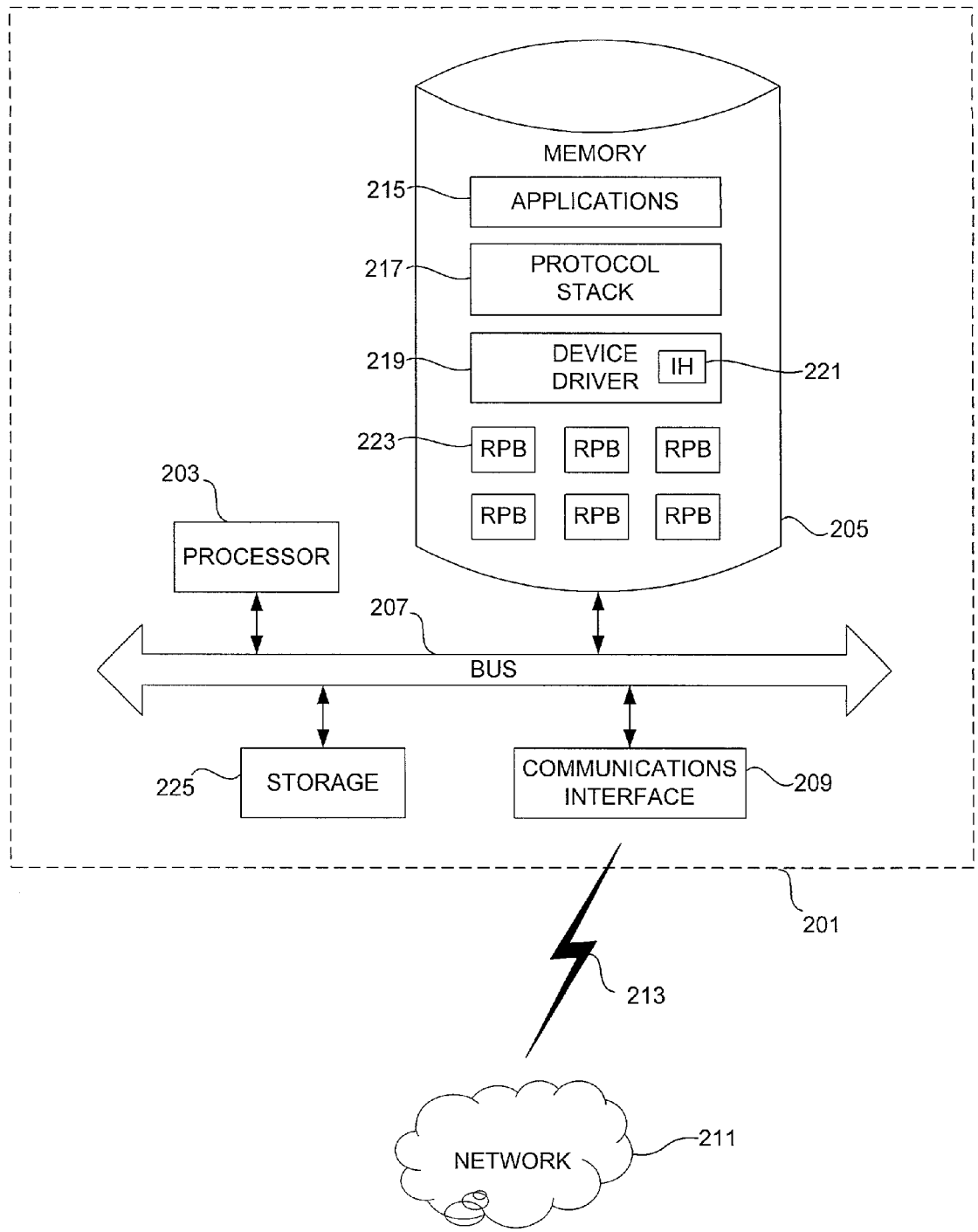
FIG. 2 is a block diagram of one embodiment of a computer system, in accordance with the teachings of the present invention, which may be used to implement the process illustrated in FIG. 1.

With reference now to the drawings, and in particular to FIG. 1, a process to reduce receive interrupts under heavy network traffic conditions via paced ingress indication is illustrated generally at 101. The process 101 includes performance of normal incoming packet procedures (see, e.g., process block 103), which, in one embodiment may include generation of receive interrupts via a network controller and automatically indicating new packets to a protocol stack via a device driver's interrupt handler function. In another embodiment, the normal incoming packet procedure may include one or more polling techniques. These features of normal incoming packet procedure, and their role in embodiments of the present invention, may be better understood with reference to FIG. 2, which illustrates a block diagram of one embodiment of a machine 201 that may be used to implement the process 101 in accordance with the teachings of the present invention.

In one embodiment, the machine 201 comprises a computer that includes a processor 203 coupled to a bus 207. In one embodiment, a memory 205, a communications interface 209, and a storage 225 are also coupled to the bus 207. It will be appreciated that other components may exist or may be incorporated into the machine 201, such as a display controller, an input/output controller, an audio controller, or the like, without departing from the spirit or scope of the present invention. In one embodiment, the memory 205 contains one or more applications 215, a protocol stack 217, a device driver 219, and a plurality of receive packet buffers ("RPB") 223. In one embodiment, the device driver 219 includes an interrupt handler function 221. In one embodiment, the applications 215, the protocol stack 217, and the device driver 219 comprise machine-readable instructions capable of being executed by the processor 203 to perform the methodologies embodied therein. In various embodiments in accordance with the teachings of the present invention, the machine 201 may comprise various types of machines, including a desktop computer or a workstation, a laptop computer, a PDA, a personal computer, a wireless phone, or other electronic equipment capable of receiving and/or transmitting signals via the communications interface 209.

In one embodiment, the machine 201 interfaces to external systems through the communications interface 209. The communications interface 209 may include a radio transceiver compatible with various modulated signals, wireless telephone signals, or the like. The communications interface 209 may also include an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices. In one embodiment, the network 211 may comprise any type of communications network through which information may be communicated, such as for example, but not limited to, the Internet, a wide area network ("WAN"), a local area network ("LAN"), an intranet, or the like.

In one embodiment, the processor 203 may be a conventional processor, such as for example, but not limited to, an Intel x86 processor, or Pentium family microprocessor, a Motorola family microprocessor, or the like. In one embodiment, the memory 205 may be a machine-readable medium such as dynamic random access memory ("DRAM"), and may include static random access memory ("SRAM").

In one embodiment, the storage 225 may include machine-readable media such as for example, but not limited to, a magnetic hard disk, a floppy disk, an optical disk, a read-only memory component ("ROM"), a smart card, or another form of storage for data. In one embodiment, the storage 225 may include removable media, read-only memory, readable/writable memory, or the like. Some of the data may be written by a direct memory access process into the memory 205 during execution of software in the computer system 201. It will be appreciated that software, such as the applications 215, the protocol stack 217, and the device driver 219, although residing in the memory 205 in the embodiment illustrated in FIG. 2, may reside in the storage 225, or may be transmitted or received via the communications interface 209. For the purpose of the specification, the term "machine-readable medium" shall be taken to include any medium that is capable of storing data, information, or encoding a sequence of instructions or operations for execution by the processor 203 to cause the processor 203 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

In one embodiment, a communications signal 213 is received/transmitted between the communications interface 209 and the network 211. In one embodiment, the communications signal 213 may be used to interface the machine 201 with another computer system, a network hub, a router, or the like. In one embodiment, the communications signal 213 is considered to be machine-readable media, which may be transmitted through wires, cables, optical fibers, or through the atmosphere, or the like.

The communications signal 213 may, in one embodiment, communicate a packet comprising data as well as routing, reliability and formatting information from the network 211 to the communications interface 209. The communications interface 209 may receive the packet and transfer the packet to one or more of the plurality of RPBs 223 in the memory 205. The plurality of RPBs may be allocated by the device driver 219 as part of an initialization of the computer system 201 such that an initialization number of RPBs are allocated. In one embodiment, the initialization number of RPBs may be within a range of from hundreds to thousands.

If the computer system 201 is operating under normal incoming packet procedures (see, e.g., block 103, FIG. 1), execution of the device driver 219 will cause the controller (e.g., network controller) of the communications interface 209 to generate a receive interrupt to inform the processor 203 that a new packet has arrived. Under these circumstances, the processor 203 will typically complete its current tasks, and switch modes to execute the device driver's interrupt handler function 221 to perform the necessary clean-up procedures, including indicating the packet, now contained in one or more RPBs 223 in the memory 205, to the protocol stack 217. In one embodiment, the protocol stack 217 will maintain the packet in a packet queue until it is able to process the packet. Processing the packet may include routing the data within the packet to one or more of the applications 215, at which time the RPBs in which the packet was contained may, in an embodiment, be returned to the device driver 219 for reuse with subsequent incoming packets.

With reference again primarily to FIG. 1, as incoming network traffic loads increase, a backlog of outstanding packets that have been indicated to the protocol stack 217 by the device driver's interrupt handler function 221, but not yet processed by the protocol stack 217, may begin to develop in the packet queue. The process 101, while continuing to perform normal incoming packet identification procedures (see, e.g., block 103), may, in one embodiment, compare the number of outstanding packets in the packet queue with an initial threshold value (see, e.g., process block 105), predefined by a system administrator for example, and incorporated into the device driver 219 at system initialization. The initial threshold value may, in an embodiment, be an arbitrary number corresponding to a predefined number of outstanding packets that a system administrator, for example, considers an acceptable upper limit to the number of outstanding packets that are allowed to accumulate in the protocol stack's packet queue (e.g., a "level" of the packet queue). Once this limit (e.g., initial threshold value) has been reached, implementation of other elements (e.g., an alternate incoming packet procedure) of the present invention enable the computer system (e.g., computer system 201) to efficiently handle incoming packets (e.g., minimizing packet latency) without overrunning the protocol stack, while processing already indicated packets without delays associated with the generation of receive interrupts.

If the number of outstanding packets in the packet queue exceeds the initial threshold value, then the process 101 proceeds to disable generation of receive interrupts by the controller of the communications interface 209 (see, e.g., process block 107), and to disable automatic packet indication by the interrupt handler function 221 of the device driver 219 (see, e.g., process block 109). In one embodiment of the present invention, the process 101 then proceeds to wait for the protocol stack 217 to process one or more packets (see, e.g., process block 111), at which time the process 101 proceeds to determine whether new packets have arrived from the network 211, and are waiting to be indicated to the protocol stack 217 (see, e.g., process block 113). If new packets are waiting to be indicated to the protocol stack 217, then the device driver 219 indicates a number of new packets to the protocol stack 217 that is equal to or less than the number of packets processed by the protocol stack at process block 111 (see, e.g., process block 115), in one embodiment. In this manner, the protocol stack is able to continue to process incoming new packets as efficiently as possible because the processor 203 need not continue to switch modes to execute the interrupt handler 221, and any danger of overrunning the protocol stack 217 is removed as packets are indicated only at an indication rate equal to or less than the rate at which packets already in the packet queue are being processed (e.g., packet processing rate), in one embodiment.

If, after waiting for outstanding packets to be processed by the protocol stack 217 (see, e.g., block 111), the process 101 determines that no new packets are waiting to be indicated (see, e.g., block 113), or after having indicated one or more packets to the protocol stack (see, e.g., block 115) then the process 101 proceeds, in one embodiment, to compare the number of outstanding packets currently in the packet queue with an exit threshold value (see, e.g., process block 117). The exit threshold value, like the initial threshold value, may, in an embodiment, be an arbitrary number corresponding to a predefined number of outstanding packets that a system administrator, for example, considers to be an acceptable limit to the number of outstanding packets remaining in the packet queue in order to return to performing normal incoming packet procedures and to disable the alternate incoming packet procedure. In one embodiment of the present invention, the exit threshold value is less than the initial threshold value. Implementing an exit threshold value that is less than the initial threshold value avoids a situation in which, for example, the exit threshold value equals the initial threshold value, and the number of outstanding packets in the packet queue remains near the threshold values, thereby causing the computer system to regularly flip back and forth between performing normal incoming packet procedures, and performing the other elements of the present invention. In one embodiment, the exit threshold value may be zero.

In one embodiment, if the number of outstanding packets currently in the packet queue exceeds the exit threshold value (see, e.g., process block 117), then the process 101 enters an iterative loop beginning at process block 111, and again waits for packets to be processed by the protocol stack. If the number of outstanding packets currently in the packet queue is less than or equal to the exit threshold value, then the process 101 returns to performing normal incoming packet identification procedures, including re-enabling generation of receive interrupts by the communications interface controller, and re-enabling automatic packet indication by the interrupt handler function 221 of the device driver 219, in an embodiment.

In practice, several methods to monitor the number of outstanding packets in the packet queue of the protocol stack may be used. For example, in one embodiment in accordance with the teachings of the present invention, monitoring the number of outstanding packets in the packet queue of the protocol stack comprises identifying a number of packets indicated to the protocol stack (e.g., by incrementing a counter each time the device driver indicates a packet to the protocol stack), and identifying a number of packets processed by the protocol stack (e.g., by incrementing a counter each time the protocol stack signals completion of a packet, or returns a RPB to the device driver for reuse with subsequent incoming packets). Having identified the number of packets indicated to the protocol stack and the number of packets already processed by the protocol stack, a simple calculation of this difference will result in a value corresponding to the number of currently outstanding packets in the packet queue (e.g., the "level" of the packet queue).

In other embodiments of the present invention, monitoring the number of outstanding packets in the packet queue of the protocol stack may comprise identifying the initialization number of RPBs 223 allocated by the computer system 201 (e.g., via the device driver 219), and identifying a number of available RPBs 223 in the host memory (e.g., memory 205). Having identified the initialization number of RPBs 223 and the number of RPBs 223 remaining available in the host memory, a simple calculation, like above, will result in a value corresponding to the number of outstanding packets in the packet queue (assuming a one-to-one relationship between packets and RPBs 223), or corresponding to the number of RPBs 223 currently in the packet queue of the protocol stack 217, which may also be used as a comparison against an appropriate (e.g. in terms of units of comparison) initial threshold value and/or exit threshold value.

Figure 3A:
FIG. 3A is a flow diagram illustrating another embodiment of a flow of events in a process to reduce receive interrupts via paced ingress indication in accordance with the teachings of the present invention.
Figure 3B:
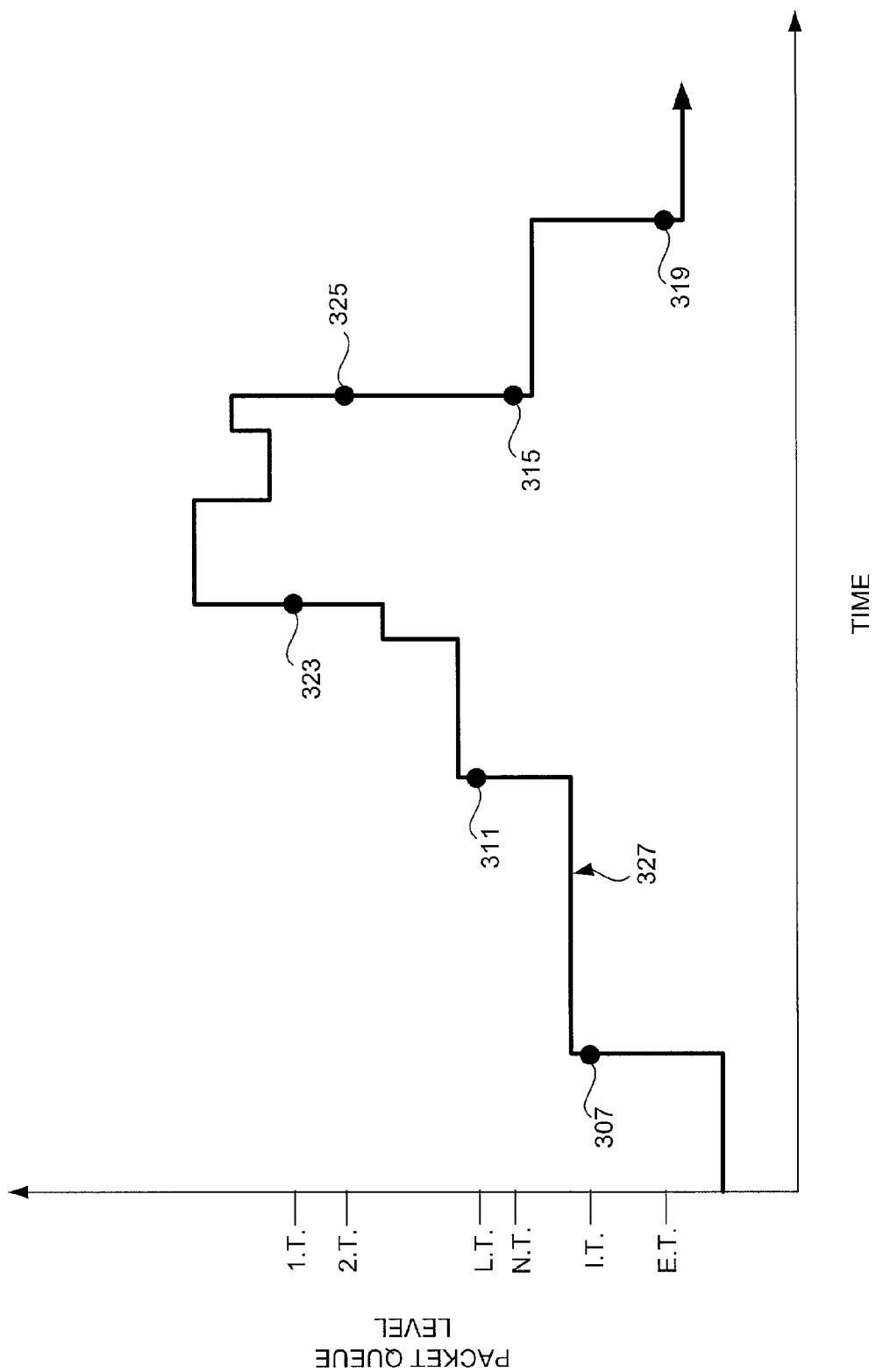
FIG. 3B is an event timeline illustrating various threshold values in conjunction with a dynamic packet queue level in accordance with the teachings of the present invention.

It will be appreciated that the foregoing description represents one embodiment of many possible embodiments in accordance with the teachings of the present invention. Other embodiments may include additional thresholds, for example, to further define the indication rate of packets to the protocol stack, for example. With reference now primarily to FIGS. 3A and 3B, other embodiments of the present invention incorporating additional thresholds or threshold combinations are illustrated. FIG. 3A is a block diagram illustrating one embodiment of a process 301 in accordance with the teachings of the present invention that includes not only the initial threshold value 307 and the exit threshold value 319 discussed above, but also a limiting threshold value 311 and a corresponding nonlimiting threshold value 315. The limiting threshold value 311 and the nonlimiting threshold value 315 may, in one embodiment in accordance with the teachings of the present invention, be used to further define the indication rate of packets to the protocol stack in response to the packet processing rate of the protocol stack.

For example, the process 301 begins, as did the process 101 (see, e.g., FIG. 1), with performance of normal incoming packets procedures (see, e.g., process block 303), which may include, in one embodiment, generation of receive interrupts and automatic packet indication by the device driver's interrupt handler function. From this point, the process 301 enters a conditional stage (see, e.g., process block 305) wherein comparisons of the level of the packet queue (e.g., the number of outstanding packets) are made with various threshold values in order to determine the appropriate action. FIG. 3B further illustrates that which is shown in process 301, as an event timeline showing the various threshold values in conjunction with a dynamic packet queue level 327 (see, e.g., FIG. 3B), and should be considered in association with FIG. 3A.

The conditional stage (see, e.g., process block 305) of process 301 begins with a comparison of the level of the packet queue 309 with the initial threshold value 307. The initial threshold value 307 (discussed here, and in conjunction with FIG. 1) may correspond to an entry condition, which when satisfied, triggers the disabling of the normal incoming packet procedure and the enabling of an alternate incoming packet procedure. In one embodiment, the entry condition may correspond to the level of the packet queue exceeding the initial threshold value 307 such that if the level of the packet queue 309 exceeds the initial threshold value 307, then the process 301 disables normal incoming packet procedures, and enables the alternate incoming packet procedure, which may include indicating packets to the protocol stack at some defined indication rate. In another embodiment, the entry condition may comprise a condition such as for example, the level of the packet queue remaining at a defined level for a defined period of time. In one embodiment, such as the embodiment illustrated and described in conjunction with FIG. 1, the indication rate may comprise a rate equal to or less than the packet processing rate of the protocol stack. In the embodiment illustrated in FIG. 3A however, which includes additional threshold values (e.g., limiting threshold value 311 and nonlimiting threshold value 315, which correspond to secondary conditions), the indication rate may comprise a rate greater than the processing rate of the protocol stack.

For example, a system administrator may wish to define an initial threshold value corresponding to 100 outstanding packets in the packet queue of the protocol stack as a point at which to disable normal incoming packet procedures, including, for example, generation of receive interrupts and automatic packet indication. However, the system administrator may also believe that the level of the packet queue (e.g., the number of outstanding packets) may safely reach 200 packets before it is in danger of being overrun, and may consequently define the indication rate (after the initial threshold value has been passed) to be greater than the packet processing rate of the protocol stack (e.g., indicate 3 packets for each processed packet, or the like). In this way, packet latency will be minimized without fear of overrunning the protocol stack's packet queues. However, at some point, the level of the packet queue may increase to such an extent that overruns become a possibility. As such, the process 301, after the initial threshold value 307 has been reached (e.g., the level 309 has crossed the initial threshold value 307), periodically compares the level of the packet queue 313 with the limiting threshold value 311. The limiting threshold value may, in one embodiment, correspond to the level (e.g. the 200 packets) of the packet queue, above which, the system administrator for example, believes that the indication rate should be reduced to a rate equal to or less than the packet processing rate in order to prevent overruns.

Once the level of the packet queue 313 has exceeded the limiting threshold value 311, for example, and packets are being indicated at a rate equal to or less than the packet processing rate, for example, the process 301 periodically compares the level of the packet queue 317 with the nonlimiting threshold value 315 in order to determine if the level of the packet queue 317 has fallen below the nonlimiting threshold value 315 such that packets may again be indicated to the protocol stack at a rate greater than the packet processing rate, in an embodiment. Finally, the process 301 compares the level of the packet queue 321 with the exit threshold value 319 (an exit condition) to determine when the packet level has decreased to such a degree that the alternate incoming packet procedure may be disabled and the normal incoming packet procedure may be re-enabled, thus beginning an iterative loop wherein the incoming packet procedure is tied to the level of the packet queue, in an embodiment. It will be appreciated that the secondary conditions (e.g., the limiting threshold value 311 and the nonlimiting threshold value 315), as well as the exit condition (e.g., the exit threshold value 319), may comprise comparisons of the level of the packet queue with a defined value, or may be satisfied by the level of the packet queue remaining at a defined level for a defined period of time, for example, or the like.

The reader will appreciate that other threshold values (e.g., secondary conditions) may also be incorporated into the conditional stage 305 of the process 301 in various embodiments to more particularly define the indication rate of packets to the protocol stack. For example, FIG. 3B shows, in addition to the initial threshold value 307, the limiting threshold value 311, the nonlimiting threshold value 315, and the exit threshold value 319, a first threshold value 323 and a second threshold value 325. The first threshold value 323 and the second threshold value 325 may be used, in one embodiment, to further reduce the indication rate of packets to the protocol stack in response to a rise in the level of the packet queue.

For instance, the initial threshold value 307 may correspond to a level of the packet queue that triggers the disabling of the normal incoming packet procedure and enabling of the alternate incoming packet procedure such that the indication rate comprises a rate of 5 packets per packet processed, for example. The limiting threshold value 311 may correspond to a level of the packet queue that triggers a reduction in the indication rate to 2 packets per packet processed, for example, while the first threshold value 323 may correspond to a level of the packet queue that triggers a further reduction in the indication rate to 1 packet per 2 packets processed, for example (e.g., a rate equal to or less than the packet processing rate). In one embodiment, the corresponding threshold values (e.g., the second threshold value 325, the nonlimiting threshold value 315, and the exit threshold value 319) may reverse the actions taken in response to the first set of threshold values (e.g., the first threshold value 323, the limiting threshold value 311, and the initial threshold value 307, respectively).

It will be appreciated that other secondary conditions including threshold value combinations or single threshold values may also be incorporated into the alternate incoming packet procedure without departing from the spirit of the present invention. The secondary conditions may correspond to defined levels of the packet queue in various embodiments, or, in other embodiments, may correspond to packet queue levels sustained for a defined period of time, for example, or the like. In addition, although the illustration shows the second set of threshold values (e.g., values 325, 315, and 319) as being lower than the first of the combination (e.g., values 323, 311, and 307, respectively), they need not necessarily be so.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method, comprising:
   receiving packets at a machine, wherein packets received at the machine are indicated to a protocol stack at the machine;
   monitoring a level of a packet queue of the protocol stack at the machine; and
   disabling a normal incoming packet procedure at the machine in response to the level of the packet queue satisfying an entry condition and enabling an alternate incoming packet procedure at the machine, the alternate incoming packet procedure including indicating new packets received at the machine, if any, to the protocol stack at an indication rate in response to a packet processing rate and altering the indication rate in response to the level of the packet queue satisfying one or more secondary conditions, if any.

2. The method of claim 1, further comprising, disabling the alternate incoming packet procedure and enabling the normal incoming packet procedure in response to the level of the packet queue satisfying an exit condition.

3. The method of claim 1, wherein the normal incoming packet procedure includes generation of receive interrupts and automatic packet indication.

4. The method of claim 1, wherein the normal incoming packet procedure includes a polling technique.

5. The method of claim 1, wherein the level of the packet queue satisfying the entry condition comprises the level of the packet queue exceeding an initial threshold value.

6. The method of claim 1, wherein the indication rate comprises a rate equal to or less than a packet processing rate.

7. The method of claim 2, wherein the level of the packet queue satisfying the exit condition comprises the level of the packet queue falling below an exit threshold value.

8. The method of claim 2, wherein the level of the packet queue satisfying the entry condition comprises the level of the packet queue exceeding an initial threshold value, and the level of the packet queue satisfying the exit condition comprises the level of the packet queue falling below an exit threshold value.

9. The method of claim 1, wherein the indication rate comprises a rate greater than a packet processing rate, and altering the indication rate in response to the level of the packet queue satisfying one or more secondary conditions comprises reducing the indication rate in response to the level of the packet queue exceeding a limiting threshold value.

10. The method of claim 9, wherein reducing the indication rate comprises reducing the indication rate to a rate equal to or less than the packet processing rate.

11. The method of claim 9, wherein altering the indication rate in response to the level of the packet queue satisfying one or more secondary conditions further comprises increasing the indication rate in response to the level of the packet queue falling below a nonlimiting threshold value.

12. The method of claim 11, wherein increasing the indication rate comprises increasing the indication rate to a rate greater than the packet processing rate.

13. The method of claim 1, wherein the level of the packet queue corresponds to a number of outstanding packets.

14. The method of claim 1, wherein the level of the packet queue corresponds to a number of receive packet buffers.

15. The method of claim 1, wherein monitoring the level of the packet queue of the protocol stack comprises:
    identifying a number of packets indicated to the protocol stack;
    identifying a number of packets processed by the protocol stack; and
    calculating a difference between the number of packets indicated to the protocol stack and the number of packets processed by the protocol stack, wherein the difference comprises a value corresponding to the level of the packet queue of the protocol stack.

16. The method of claim 1, wherein monitoring the level of the packet queue of the protocol stack comprises:
    identifying an initialization number of receive packet buffers;
    identifying a number of available receive packet buffers in host memory; and
    calculating a difference between the initialization number of receive packet buffers and the number of available receive packet buffers in host memory, wherein the difference comprises a value corresponding to the level of the packet queue of the protocol stack.

17. The method of claim 8, wherein the initial threshold value corresponds to a number of receive packet buffers, the number of receive packet buffers equal to a percentage of an initialization number of receive packet buffers.

18. The method of claim 8, wherein the initial threshold value corresponds to a number of outstanding packets.

19. The method of claim 8, wherein the exit threshold value is less than or equal to the initial threshold value.

20. The method of claim 1, wherein the packet processing rate comprises a rate at which receive packet buffers are returned to a device driver from the protocol stack.

21. The method of claim 1, wherein the packet processing rate comprises a rate at which packets are processed by the protocol stack.

22. A method, comprising:
    monitoring a level of a packet queue of a protocol stack at a computer, wherein the level of the packet queue corresponds to outstanding packets that have been received at the computer and are awaiting processing;
    in response to the level of the packet queue exceeding an initial threshold value, disabling generation of receive interrupts at the computer, disabling automatic packet indication at the computer, identifying new packets received at the computer, if any, and indicating new packets received at the computer, if any, to the protocol stack at an indication rate equal to or less than a packet processing rate of the protocol stack; and
    in response to a decrease in the level of the packet queue below an exit threshold value, enabling the generation of receive interrupts at the computer, and enabling the automatic packet indication at the computer.

23. The method of claim 21, wherein the initial threshold value corresponds to a number of outstanding packets.

24. The method of claim 21, wherein the exit threshold value is less than or equal to the initial threshold value.

25. An apparatus, comprising:
    a processor;
    a memory, coupled to the processor, to store a plurality of machine instructions including a protocol stack and a device driver; and
    a communications interface, coupled to the processor, and capable of being connected to a network to receive packets from the network;
    wherein execution of the machine instructions by the processor cause the apparatus
    to monitor a level of a packet queue of the protocol stack at the apparatus, wherein packets received at the apparatus are indicated to the protocol stack, and
    to disable a normal incoming packet procedure at the apparatus associated with the communications interface and the device driver in response to the level of the packet queue satisfying an entry condition and enable an alternate incoming packet procedure at the apparatus associated with the communications interface and the device driver, the alternate incoming packet procedure including the device driver indicating new packets received at the communications interface, if any, to the protocol stack at an indication rate in response to a packet processing rate of the protocol stack and altering the indication rate in response to the level of the packet queue satisfying one or more secondary conditions, if any.

26. The apparatus of claim 25, wherein execution of the machine instructions by the processor further cause the apparatus to disable the alternate incoming packet procedure and enable the normal incoming packet procedure in response to the level of the packet queue satisfying an exit condition.

27. The apparatus of claim 26, wherein the level of the packet queue satisfying the entry condition comprises the level of the packet queue exceeding an initial threshold value, the indication rate comprises a rate equal to or less than the packet processing rate, and the level of the packet queue satisfying the exit condition comprises the level of the packet queue falling below an exit threshold value.

28. The apparatus of claim 25, wherein the indication rate comprises a rate greater than a packet processing rate, and altering the indication rate in response to the level of the packet queue satisfying one or more secondary conditions comprises reducing the indication rate in response to the level of the packet queue exceeding a limiting threshold value.

29. The apparatus of claim 28, wherein altering the indication rate in response to the level of the packet queue satisfying one or more secondary conditions further comprises increasing the indication rate in response to the level of the packet queue falling below a nonlimiting threshold value.

30. An article of manufacture, comprising:
a machine-readable medium that provides instructions, which, when executed by a machine, cause the machine
to monitor a level of a packet queue of a protocol stack at the machine, wherein packets received at the machine are indicated to the protocol stack, and
to disable a normal incoming packet procedure at the machine in response to the level of the packet queue satisfying an entry condition and enable an alternate incoming packet procedure at the machine, the alternate incoming packet procedure including indicating new packets received at the machine, if any, to the protocol stack at an indication rate in response to a packet processing rate of the protocol stack and altering the indication rate in response to the level of the packet queue satisfying one or more secondary conditions, if any.

31. The article of manufacture of claim 30, wherein the machine-readable medium further provides instructions, which, when executed by the machine, further cause the machine to disable the alternate incoming packet procedure and enable the normal incoming packet procedure in response to the level of the packet queue satisfying an exit condition.

32. The article of manufacture of claim 31, wherein the level of the packet queue satisfying the entry condition comprises the level of the packet queue exceeding an initial threshold value, the indication rate comprises a rate equal to or less than the packet processing rate, and the level of the packet queue satisfying the exit condition comprises the level of the packet queue falling below an exit threshold value.

33. The article of manufacture of claim 30, wherein the indication rate comprises a rate greater than a packet processing rate, and altering the indication rate in response to the level of the packet queue satisfying one or more secondary conditions comprises reducing the indication rate in response to the level of the packet queue exceeding a limiting threshold value.

34. The article of manufacture of claim 33, wherein altering the indication rate in response to the level of the packet queue satisfying one or more secondary conditions further comprises increasing the indication rate in response to the level of the packet queue falling below a nonlimiting threshold value.

* * * * *